US009600564B2

(12) United States Patent
Loeser

(10) Patent No.: US 9,600,564 B2
(45) Date of Patent: *Mar. 21, 2017

(54) METHOD AND SYSTEM FOR HANDLING NON-PRESENCE OF ELEMENTS OR ATTRIBUTES IN SEMI-STRUCTURED DATA

(71) Applicant: International Business Machines Corporation, Armonk, NY (US)

(72) Inventor: Henrik Loeser, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 13/974,009

(22) Filed: Aug. 22, 2013

(65) Prior Publication Data

US 2013/0339368 A1   Dec. 19, 2013

Related U.S. Application Data

(63) Continuation of application No. 12/881,155, filed on Sep. 13, 2010, now Pat. No. 8,549,398.

(30) Foreign Application Priority Data

Sep. 17, 2009 (EP) .................................... 09170491

(51) Int. Cl.
*G06F 17/22* (2006.01)
*G06F 17/30* (2006.01)

(52) U.S. Cl.
CPC .. *G06F 17/30613* (2013.01); *G06F 17/30911* (2013.01); *G06F 17/30961* (2013.01)

(58) Field of Classification Search
CPC ......... G06F 17/30911; G06F 17/30613; G06F 17/30896; G06F 17/30961; G06F 17/2247; G06F 17/2725; G06F 17/272
See application file for complete search history.

(56) References Cited

U.S. PATENT DOCUMENTS

| | | | | |
|---|---|---|---|---|
| 5,875,445 | A * | 2/1999 | Antonshenkov | .. G06F 17/30327 |
| 6,853,992 | B2 * | 2/2005 | Igata | ................ G06F 17/30911 |
| | | | | 707/741 |
| 6,912,538 | B2 * | 6/2005 | Stapel | ............... G06F 17/30569 |
| 7,287,023 | B2 | 10/2007 | Fan et al. | |
| 7,287,033 | B2 * | 10/2007 | Shadmon | ............ G06F 17/3061 |
| 7,321,900 | B1 * | 1/2008 | Karun | ................ G06F 17/30923 |
| 7,493,305 | B2 * | 2/2009 | Thusoo | ............. G06F 17/30911 |

(Continued)

OTHER PUBLICATIONS

Chen et al. "Index Structures for Matching XML Twigs Using Relational Query Processors." Data & Knowledge Engineering; Feb. 2007; vol. 60, Issue 2; pp. 283-302.

*Primary Examiner* — Maikhanh Nguyen
(74) *Attorney, Agent, or Firm* — Steven M. Greenberg, Esq.; CRGO Law

(57) ABSTRACT

The invention relates to detecting non-presence of nodes in a document of semi-structured data and to creating a values index which properly reflects this non-presence. The document of semi-structured data, comprising multiple hierarchically organized nodes, is scanned for values (step 110). Subsequently, these values are indexed (step 120). As non-presence of at least one node is detected (step 140), this non-presence is documented by enhancing the values index (12) by a pseudo key (20) (step 150).

7 Claims, 5 Drawing Sheets

(56) References Cited

U.S. PATENT DOCUMENTS

| | | | |
|---|---|---|---|
| 7,856,437 B2 * | 12/2010 | Kirshenbaum | ... G06F 17/30097 707/737 |
| 8,037,082 B2 * | 10/2011 | Ting | ............... G06F 17/2247 707/738 |
| 8,145,667 B2 * | 3/2012 | Leung | ............... G06F 17/3092 707/770 |
| 2001/0007987 A1 * | 7/2001 | Igata | ............... G06F 17/30911 |
| 2002/0065822 A1 | 5/2002 | Itani | |
| 2003/0204515 A1 * | 10/2003 | Shadmon | ............ G06F 17/3061 |
| 2003/0212662 A1 | 11/2003 | Shin et al. | |
| 2005/0228791 A1 * | 10/2005 | Thusoo | ............. G06F 17/30911 |
| 2006/0004791 A1 * | 1/2006 | Kleewein | ........... G06F 17/30961 |
| 2007/0250503 A1 | 10/2007 | Breining et al. | |
| 2007/0276792 A1 * | 11/2007 | Tarachandani | ...... G06F 17/2229 |
| 2008/0010313 A1 | 1/2008 | Thede | |
| 2008/0071809 A1 | 3/2008 | Lomet | |
| 2009/0037456 A1 | 2/2009 | Kirshenbaum et al. | |
| 2009/0037500 A1 | 2/2009 | Kirshenbaum | |
| 2009/0043736 A1 | 2/2009 | Han et al. | |
| 2009/0043806 A1 | 2/2009 | Han et al. | |
| 2011/0022638 A1 | 1/2011 | Jiang | |

* cited by examiner

METHOD AND SYSTEM FOR HANDLING NON-PRESENCE OF ELEMENTS OR ATTRIBUTES IN SEMI-STRUCTURED DATA

CROSS-REFERENCE TO RELATED APPLICATIONS

This application is a Continuation Application of U.S. application Ser. No. 12/881,155, filed on Sep. 13, 2010, entitled "METHOD AND SYSTEM FOR HANDLING NON-PRESENCE OF ELEMENTS OR ATTRIBUTES IN SEMI-STRUCTURED DATA", which claims priority under 35 U.S.C. §119(a) to European Patent Application Serial Number 09170491.6, filed Sep. 17, 2009, entitled "METHOD AND SYSTEM FOR HANDLING NON-PRESENCE OF ELEMENTS OR ATTRIBUTES IN SEMI-STRUCTURED DATA", the entirety of which is incorporated herein by reference.

FIELD OF THE INVENTION

The invention relates generally to the field of indexing semi-structured data such as XML document data. More specifically, the invention relates to a method of handling non-presence of data elements or attributes in semi-structured data.

BACKGROUND OF THE INVENTION

With the increasing impact of the World Wide Web, a lot of attention has been given to XML (Extensible Markup Language) which has become a universally accepted standard for exchanging data over the Web. XML is a format for representing semi-structured (i.e. irregularly structured) data in textual form. XML documents comprise hierarchically nested collections of elements which may be accessed following the document's tree structure. XML query languages such as XQuery and XPath use path expressions to traverse these semi-structured data and access specific nodes. Thus, the task of navigating through irregularly structured graphs is of central importance in processing XML queries. In order to make the processing of queries efficient, a well-directed access of the data stored in the XML document is required; this may be achieved by introducing an appropriate index structure which supports query processing and improves its performance.

Generally, an index is a data structure that improves the speed of operations on a database table such as executing queries against the database. Existing database management systems, such as relational database and object-oriented database systems, generally comprise mechanisms for rapidly retrieving based on key fields in the database. These mechanisms include index structures based on B-trees as well as indices constructed around key fields that are frequently queried in order to enable fast searching on these fields. Similar indexing mechanisms may be applied to XML documents, thus creating so-called XML values indices comprising information about existing nodes and the data which they contain. These XML values indices support and speed up XML document handling and querying such as extracting, comparing etc. elements or attributes to and from XML documents. However, these indices—adopted from relational databases with rigid structures—may exhibit inadequacies when applied to semi-structured data such as XML documents. In particular, they are incapable of dealing with documents in which specific elements or attributes are missing, i.e. are non-present.

Note that this situation cannot occur in structured (relational) databases, since non-presence of a data value is indicated as a database table entry with a NULL, N/A, etc. indicator; thus, in a relational database, there is always an entry (i.e. a column in a specific row) for a data field, even when the data field has no value. When the database table is indexed, the non-present values are automatically indexed using the standard indexing procedures of relational databases since a corresponding indicator (NULL, N/A, etc.) is present in the database rows.

In contrast, an XML document can contain either zero, one or multiple nodes at different hierarchy levels. Since there is no NULL indicator, a non-presence of a node on a given hierarchy level is not automatically indexed. Thus, a regular values index—of the kind that is used on fully structured data—is not capable of detecting a non-existence of a specific node when applied to semi-structured data such as an XML document. This index does not support searches for documents which do not possess certain criteria, i.e. do not have specific values.

A method for a full-text index on XML data, including wildcard search support and partial matches, is described in US 2008/0010313 A1. This method, however, does not support searching documents for the non-presence of certain nodes and thus cannot solve the problem outlined above.

Aside from efforts geared at developing advanced regular (values) indices for XML documents, a variety of XML indexing techniques—some of them based on the concept of a so-called structural index—have been suggested and developed for tackling semi-structured data. A structural index keeps track of all paths within the document structure, notably the hierarchical relation of its nodes (elements and attributes). The article "Index structures for matching XML twigs using relational query processors" by Z. Chen et al, Data & Knowledge Engineering 60 (2007), pp. 283-302 gives an overview of various XML path indices, relational join indices as well as object-oriented path indices. This article also introduces novel indexing structures geared at finding documents with specific path/value combinations. These, however, do not lend themselves to solving the problem of efficiently spotting documents not having specific properties.

IBM's DB2 comprises a path index which registers all paths within a database table but does not keep track of which specific path occurs in which specific documents within the table. This path index, constituting a subset of the generalized structural index outlined above, is therefore not capable of detecting and reflecting non-presence of data within specific documents and cannot be used for queries directed at documents which do not possess certain criteria.

US 2003/0212662 A1 describes a method for looking up paths identified by regular path expressions and then finding the related data. The XML data is stored in regular relational tables. The problem of indexing data contained in the XML documents—and, notably, of detecting documents which do not contain specific nodes or specific paths—is not addressed.

U.S. Pat. No. 7,287,023 suggests usage of a structural index which indexes the entire document and thereby remembers which paths are present and where. However, this structural index will generally not make use of any XML values index that may already be in place. Rather, the structural index is an additional index which may require considerable amounts of storage space since it indexes all paths within the entire document.

In summary, while prior art XML values indices furnish values of data stored in specific nodes of an XML document, they are incapable of detecting non-presence of certain nodes within XML documents. On the other hand, XML path indices reflect the hierarchical structure of the XML documents but are inefficient (or not capable) to yield specific values. However, users usually want to index a certain path within an XML document as well as query for specific values stored within this document. In order to satisfy these two requirements, both a XML values index and a XML structural index are needed, thus duplicating the required resources, computational expenditure as well as storage space. This is clearly wasteful.

Thus, there is a need for a method that handles non-presence of nodes in semi-structured data documents, e.g. XML documents, in such a way that information on the non-presence is consistently represented within a corresponding index. In situations in which an XML values index has already been put in place, the method should build upon this XML values index, thus saving computation time and minimizing storage space.

SUMMARY OF THE INVENTION

It is an objective of the invention to provide a values index which is capable of properly reflecting non-presence of nodes within semi-structured data. It is a further objective of the invention to enhance existing values index in such a way that this enhanced values index is capable of correctly handling non-presence of nodes within the semi-structured data.

These objectives are achieved by the features of the independent claims. The other claims and the specification disclose advantageous embodiments of the invention.

According to a first aspect of the invention, a method for supplementing an existent values index for a document of semi-structured data comprising multiple hierarchically organized nodes is provided. The method comprises the steps of (1) detecting non-presence of at least one node, and (2) indicating the non-presence of this node in the semi-structured document in the values index. This embodiment of the invention thus enhances an existing values index in such a way that it is capable of correctly reflecting non-presence of nodes within the document.

According to a second aspect of the invention, a method for creating a values index for a document of semi-structured data comprising multiple hierarchically organized nodes is provided. The method comprises the steps of (1) detecting values present in the semi-structured document, (2) indexing these values, (3) detecting non-presence of at least one node, and (4) indicating the non-presence of said node in said document by a pseudo key in said values index. The values index thus created supports queries related to documents which do not have a specific element or attribute.

According to a third aspect of the invention, a computer system for creating a values index for a document of semi-structured data with multiple hierarchically organized nodes is provided. The computer system comprises (1) a Values Identification System for detecting values present in said semi-structured document, (2) an Indexing System for indexing said values, (3) a Non-Presence Detection System for detecting non-presence of at least one node in the semi-structured data, and (4) a Pseudo-Key Generating System for creating a pseudo key in said values index, the pseudo key corresponding to said non-present node.

BRIEF DESCRIPTION OF THE DRAWINGS

The present invention together with the above-mentioned and other objects and advantages may best be understood from the following detailed description of the embodiments, but not restricted to the embodiments, wherein is shown in.

Figure 1:
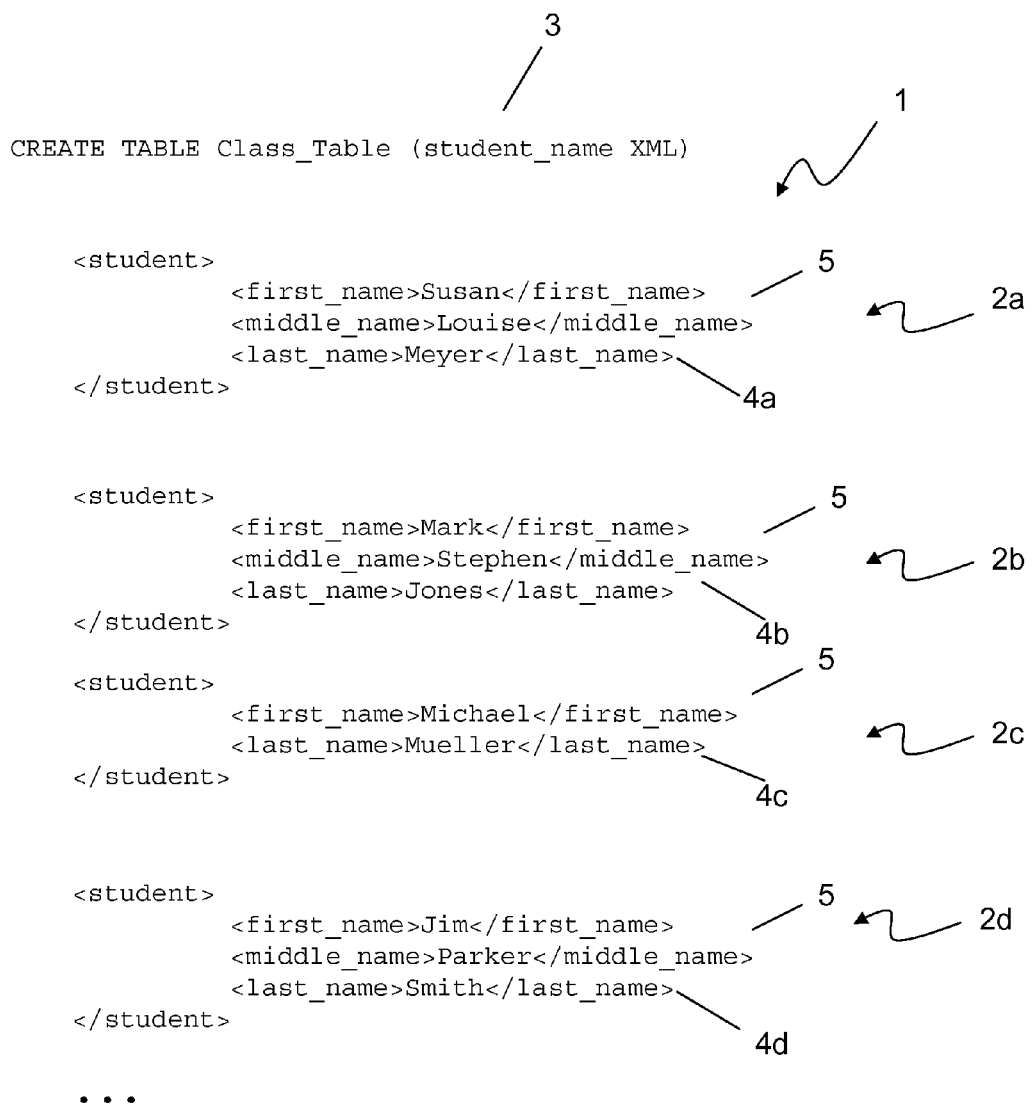
FIG. 1 a table Class_Table holding four XML documents.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

FIG. 1 shows a table 1 named Class_Table which holds several XML documents 2a-2d in a column 3 named student_name. Markup language documents such as XML or HTML documents are examples of semi-structured data, i.e. hierarchically nested collections of elements without the rigid structure of a relational database.

Each XML document 2a-2d of FIG. 1 comprises a root element <student> with children elements <first name>, <middle_name> and <last_name>. The <student> element denoted by numeral 2c, however, has only two children <first name> and <last_name>; this <student> element 2c lacks the <middle_name>, which is equivalent to saying that the element <middle_name> is non-present in this <student> element 2c.

Table 1 represents part of an XML database. Information is extracted from this database by executing specific queries against this database. In order to enable fast data retrieval from a specific column 3 of the database, an XML values index pointing to this specific column 3 is employed. Note that since column 3 contains XML documents, multiple (in general: hundreds) of indices are possible on this single XML column 3. As opposed to a regular values index for a relational database index which generates exactly one index entry for each tuple, an XML index may generate zero, one or multiple index entries for a given tuple, depending on the number of elements/attributes of the document stored in this specific tuple.

Figure 2A:
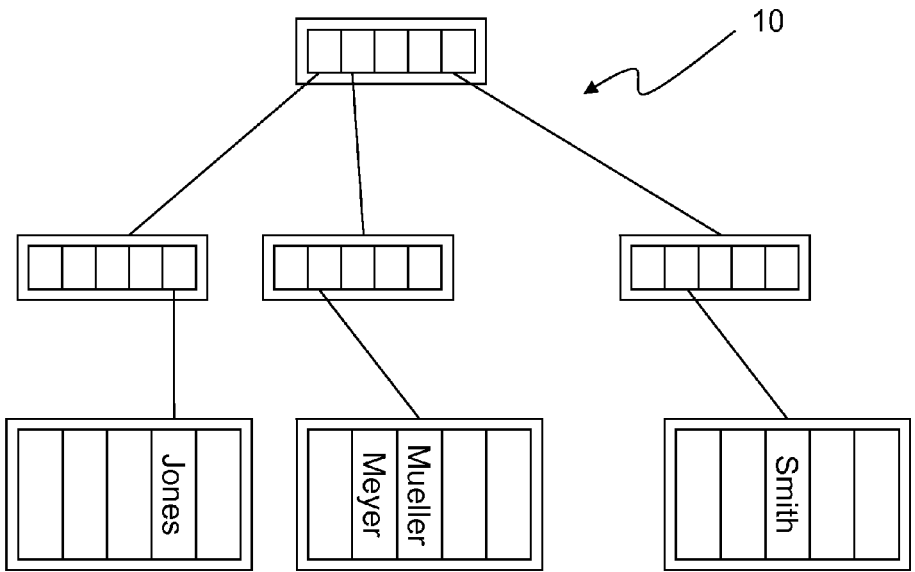
FIG. 2a a schematic diagram of an XML values index for retrieving students' last names from the Class_Table of FIG. 1.

As an example, consider an XML values index 10 used for retrieving students' last names stored in table 1 (Class_Table) of FIG. 1. This XML values index 10 may be based on B-trees with special keys. The XML values index 10 points to the XML column 3 (student_name) and accesses the value contained within the last_name element 4a-4d. This XML index 10 is defined with a so-called XML pattern, i.e. an expression similar to an XPath expression ("/student/ last_name") for selecting the appropriate node. An XML index created by a statement (using DB2 syntax) like:

CREATE INDEX index_last_name ON Class_Table (student_name) GENERATE KEY USING XMLPATTERN '/student/last_name' would include the last names "Meyer", "Jones", "Mueller" and "Smith" into this index (see FIG. 2a). Thus, by using this XML values index, one would successfully access all students by the text nodes ("Meyer", "Jones", "Mueller", "Smith", . . . ) stored within the element nodes <last_name>.

In contrast, an XML values index 11 directed at the <middle_name> element 5 would retrieve incomplete results, since at least one document 2c lacks the <middle_name> node, and an XML values index 11 by nature contains only information about existing elements and thus cannot point to a non-present element. Thus, if XML values index 11 is constructed in such a way that the value contained within the middle_name element 5 is accessed, CREATE INDEX index_middle_name ON Class_Table (student_name) GENERATE KEY USING XMLPATTERN '/student/middle_name' only the middle names "Louise", "Stephen" and "Parker" would be included in this index; no entry would be generated for the third document 2c of Class_Table 1. The XML values index 11 thus furnishes incomplete data whenever non-existent nodes occur in the corresponding column within the XML document table. In order to complement the data, one would have to scan the entire document for missing middle_name entries:

select student_name from Class_Table where xmlexists('$student_name/student[fn:not(middle_name)]')

This operation is very common, but it is inefficient because it is not supported by an index.

Figure 2B:
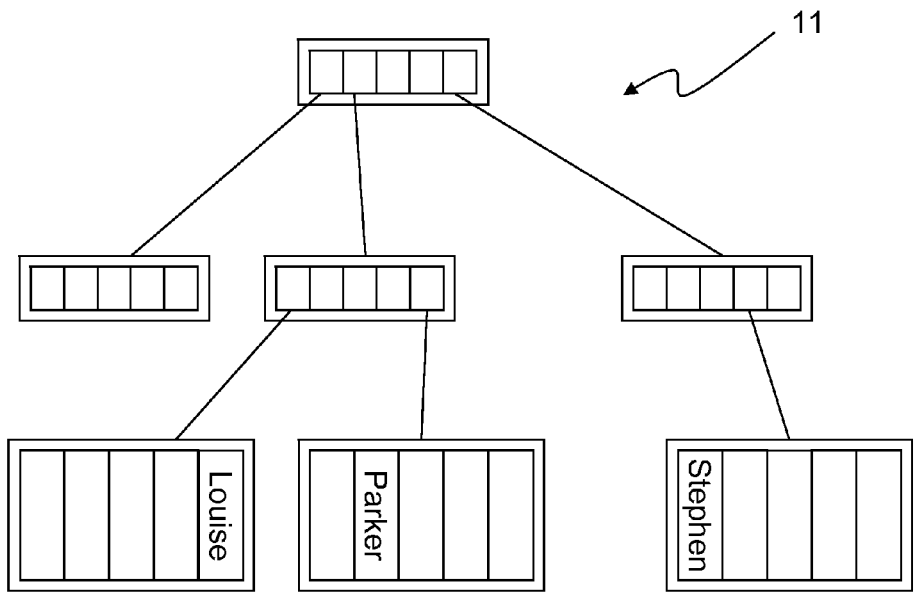
FIG. 2b a schematic diagram of an XML values index for retrieving students' middle names from the Class_Table of FIG. 1.
Figure 2C:
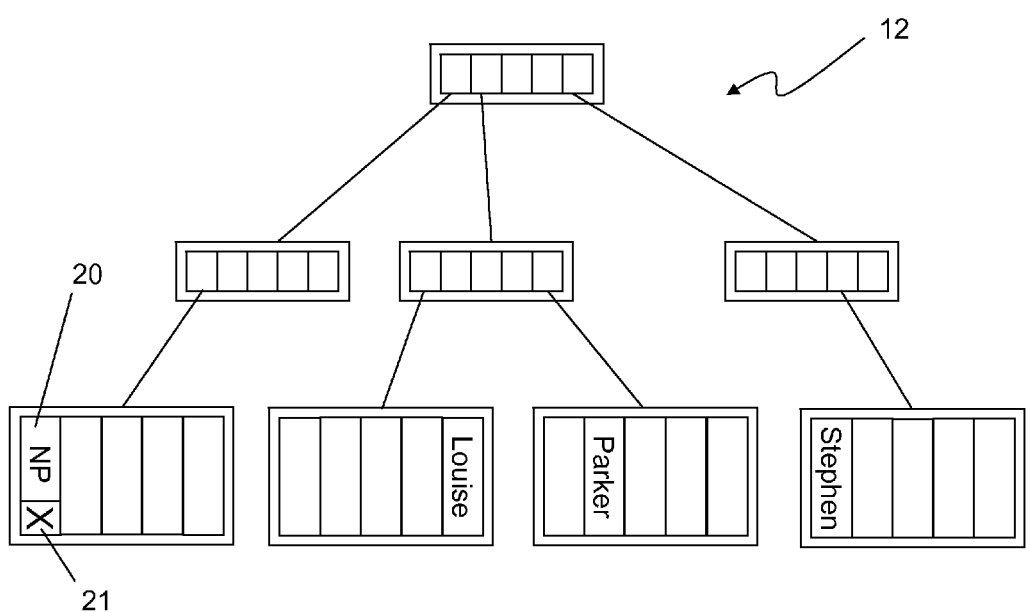
FIG. 2c a schematic diagram of an enhanced XML values index for retrieving students' middle names from the Class_Table of FIG. 1.

In order to overcome this deficiency and to be able to properly include XML documents with non-existent nodes, the XML values index 11 of FIG. 2b is enhanced by adding NON-PRESENCE pseudo keys, resulting in an enhanced XML values index 12 depicted in FIG. 2c showing one NON-PRESENCE pseudo key 20 corresponding to the non-presence of a middle name in XML document 2c. During index creation, the non-presence of a given node is reflected by a new option INCLUDE NON-PRESENCE, indicating that non-present elements should be handled as well. Thus, whenever non-presence of a specific node is detected, a pseudo key 20 in the enhanced XML values index 12 is generated in order to represent this non-existent node. An existing instance of an XML values index will need to be updated by extending and adjusting its structure in order to accommodate this NON-PRESENCE entry. However, the underlying index structure as well as the database infrastructure already in place can be reused, thus minimizing the effort required for implementing an index 12 which properly reflects non-existent nodes. In particular, the time and effort of introducing an altogether different indexing concept can be avoided.

When an index is initially created, and whenever new documents are inserted into the table, one typically first collects all index keys and then adds them to the index. During the insert of an XML document, each node of the corresponding XML document tree is processed, and all existing XML indices are checked to determine whether they match the node; in case of a match, the node's value is added to the specific values index. Different techniques are available for detecting non-existence of a specific node (corresponding to a specified indexed path within the XML document). For example, the index keys held in the buffer may be scanned. Alternatively, a signal could be set during document processing to remember whether a given path occurred or not. If one detects that a specific path is not present, a pseudo key 20 is generated, equipped with a flag 21 marking it as a non-presence and added to the index. The flag 21 acts as an indicator for differentiating the pseudo key 20 from "normal" index keys, thus ensuring that collisions between pseudo keys 20 and "normal" index keys are avoided.

Figure 3:
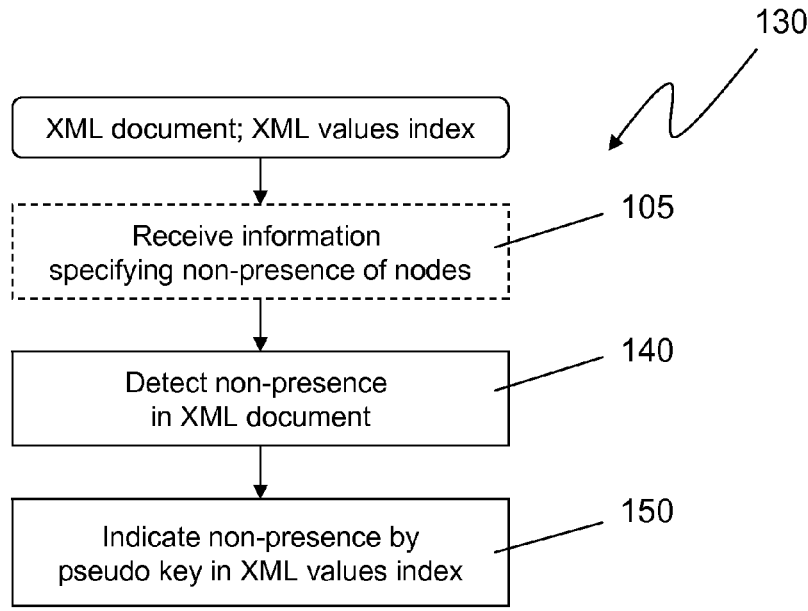
FIG. 3 a flow diagram of a method for enhancing an existing XML values index according to a first aspect of the invention.

FIG. 3 shows a schematic flow diagram of a method 130 for enhancing an existing XML values index 11 which is incomplete in the sense that it does not properly reflect non-presence of nodes in the corresponding XML document. The method comprises a step 140 of detecting non-presence of a node in the XML document, followed by a step 150 of adding a pseudo key 20 in the XML values index 11, this pseudo key 20 reflecting the non-present node. Method 130 transforms the incomplete XML values index 11 into an enhanced XML values index 12 capable of handling non-presence of nodes in the XML document. Step 140 of detecting the non-presence of a node may be assisted by receiving information specifying the non-presence of the node(s) (step 105), for example information on the relevant hierarchy level(s) of the non-present node(s).

Figure 4:
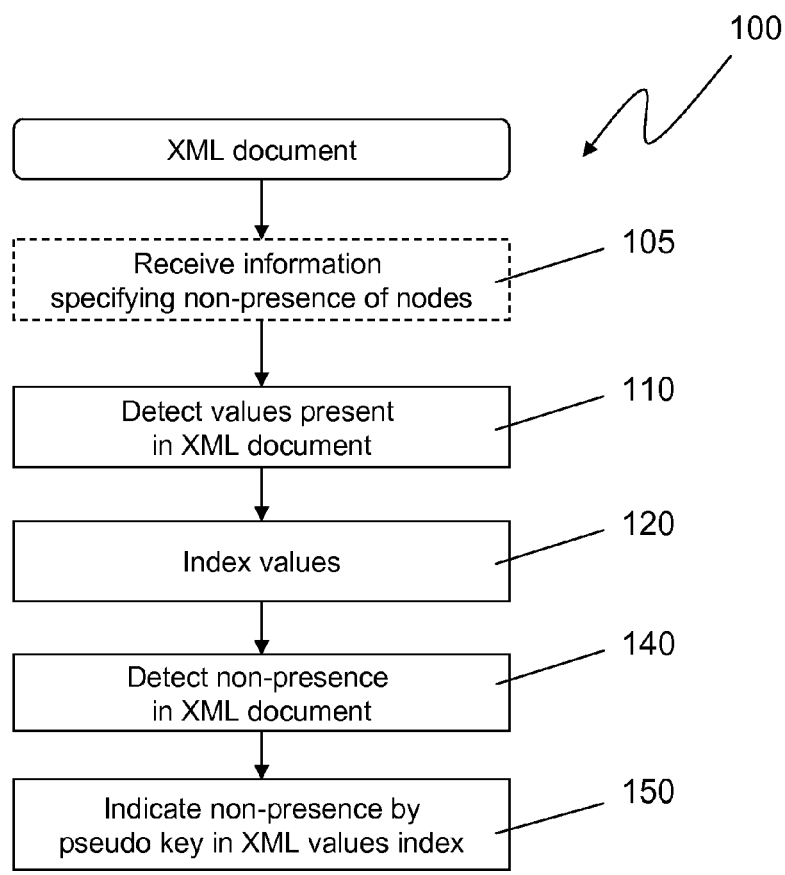
FIG. 4 a flow diagram of a method for creating an enhanced XML values index according to a second aspect of the invention.

FIG. 4 shows a schematic flow diagram of a method 100 for creating an enhanced XML values index 12 which enables queries on an XML document characterized by non-presence of at least one node. Method 100 begins by collecting values of nodes contained in a given column (step 110) and by indexing these values (step 120), for example by using a B-tree structure. Subsequently, one of the existing techniques for detecting non-existence of nodes is applied (step 140). As a non-presence of a specific node is detected, a pseudo key 20 is generated for the non-present node (step 150).

Whenever, during query processing, a search for non-present elements is to be conducted, the enhanced XML values index 12 is scanned for the corresponding pseudo key 20 and checked for the flag 21 that marks the key as non-present. Using the enhanced XML values index 12, it is thus possible to detect non-present nodes within the XML documents. The very same enhanced XML values index 12 continues to be used when querying the XML documents for specific data, e.g. searching for all documents relating to students with a middle name of "Stephen".

The enhanced index described above thus is based on a regular values index for a given XML document and expands this values index by adding pseudo keys 20, thus accounting for non-existent nodes within the XML document. As a consequence, existing index technology can be reused to handle new types of queries, i.e. queries directed at columns which may contain non-existent nodes, for example requests such as "Find all patients who do not exhibit a (specific) symptom . . . ", "Find all bank customers who have not received a (specific) consultation . . . ", "Find all insurance customers who were not sent a (specific) correspondence, . . . ", etc. Such queries, which are common among XML database users, previously required the introduction of an additional index, i.e. a structural index, reflecting the document structure, notably the hierarchical relation of its nodes. The requirement of two concurrent indices is both expensive to implement and complicates system usage. By introducing an enhanced XML values index 12 with entries 20 reflecting non-presence of specific nodes, it is possible to support these queries without too much development effort and without adding a new index types (and, consequentially, learning effort) to the system.

The enhanced XML values index 12 combines the best of both index types (regular values index as well as structural index) in one, building on a values index which is generally already in place (and which the user is already used to), and minimizing the amount of space required.

Figure 5:
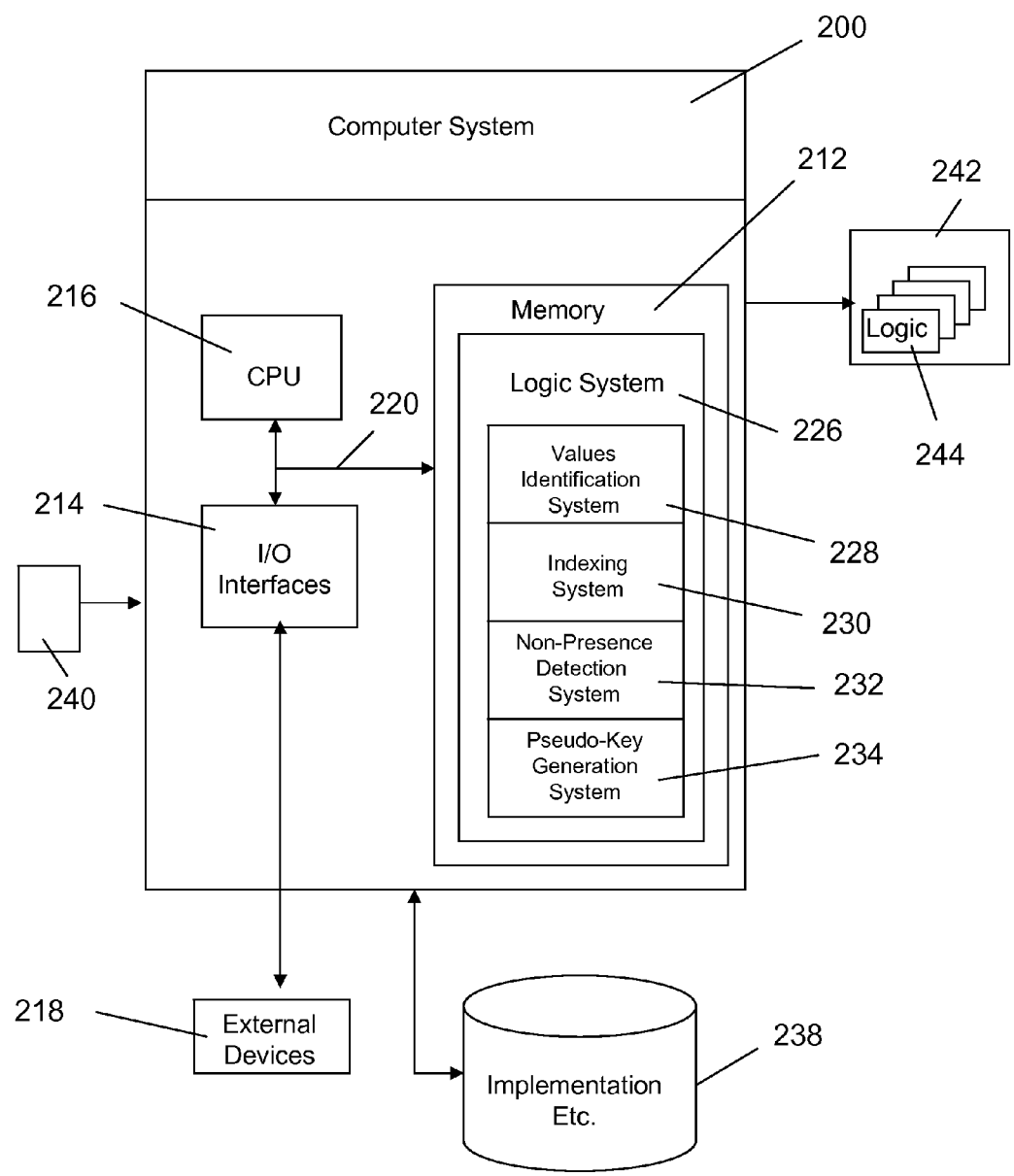
FIG. 5 a computer system implementation of a preferred method for creating an enhanced XML values index.

Referring now to FIG. 5, a computer system 200 implementation of a preferred embodiment of the present invention is shown. Specifically, the present invention can be implemented as a computer system 200 and/or program product for detecting non-presence of nodes in an XML document and generating pseudo key entries 20 for them, thus creating an enhanced XML values index 12 which contains complete information on these non-present nodes. This allows a user 240 to perform queries for specific values stored within XML documents irrespective of potential non-presence of nodes within these documents.

As depicted, computer system 200 generally comprises memory 212, input/output (I/O) interfaces 214, a central processing unit (CPU) 216, external devices/resources 218, bus 220 and data base 238. Memory 212 may comprise any known type of data storage and/or transmission media, including magnetic media, optical media, random access memory (RAM), read-only memory (ROM), a data cache, a data object etc. Moreover, memory 212 may reside at a single physical location, comprising one or more types of data storage, or can be distributed across a plurality of physical systems in various forms. CPU 216 may likewise comprise a single processing unit, or be distributed across one or more processing units in one or more locations, e.g. on a client and server. I/O interfaces 214 may comprise any system for exchanging information from an external source. External devices 218 may comprise any known type of external device, including keyboard, mouse, voice recognition system, printer, monitor, facsimile etc. Bus 220 provides a communication link between each of the components in the computer system 200 and likewise may comprise any known type of transmission link, including electrical, optical, wireless etc. In addition, although not shown, additional components such as cache memory, communication systems, system software etc. may be incorporated into computer system 200.

Database 238 provides storage for information necessary to carry out the present invention. Such information could include e.g. information specifying the non-presence of node(s) within the XML document, relevant hierarchy level of this non-present node(s), etc. Database 238 may include one or more storage devices, such as a magnetic disk drive or an optical disk drive. In another embodiment, database 238 includes data distributed across, for example, a local area network (LAN), wide are network (WAN) or a storage area network (SAN). Database 238 may also be configured in such a way that one of ordinary skill in the art may interpret it to include one or more storage devices. Moreover, it should be understood that database 238 could alternatively exist within computer system 200.

Stored in memory 212 is logic system 226. As depicted, logic system 226 generally includes Values Identification System 228 for detecting values present in a semi-structured document, Indexing System 230 for indexing said values, Non-Presence Detection System 232 for detecting non-presence of at least one node in the semi-structured data, and Pseudo-Key Generating System 234 for creating an enhanced values index 12 with a pseudo key 20 corresponding to said non-present node.

The systems shown herein carry out the functions described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for supplementing an existent values index for a document of semi-structured data comprising multiple hierarchically organized nodes, the method comprising the steps of:
   loading into memory of a computer both a document of semi-structured data of irregularly structured data in textual form, and also a separate value index for the document,
   comparing by a processor of the computer values in the document to entries in the value index, and
   responsive to detecting non-presence in the document of at least one node in the value index,
   indicating by the processor the non-presence of said node in said document by inserting in the value index a pseudo key generated by a pseudo-key generating system executing in the memory of the computer,
   wherein the document is an XML document, and wherein the value index is an XML values index, the XML values index contains complete information of the multiple hierarchically organized nodes of the XML document.

2. The method according to claim 1, wherein the method comprises a step of receiving information specifying the non-presence of at least one node.

3. The method according to claim 2, wherein the information receiving step comprises a step of receiving information on the relevant hierarchy level of said non-present node.

4. A method for creating a values index for a document of semi-structured data comprising multiple hierarchically organized nodes, the method comprising the steps of:
   loading into memory of a computer both a document of semi-structured data of irregularly structured data in textual form, and also a separate value index for the document,
   detecting values present in said semi-structured document, indexing said values in the separate value index,
   comparing by a processor of the computer values in the document to entries in the value index, and
   responsive to detecting non-presence in the document of at least one node in the value index, and
   indicating by the processor the non-presence of said node in said document by inserting in the value index a pseudo key generated by a pseudo-key generating system executing in the memory of the computer,
   wherein the document is an XML document, and wherein the value index is an XML values index, the XML values index contains complete information of the multiple hierarchically organized nodes of the XML document.

5. A data processing program stored on a non-transitory computer usable storage medium for creating a values index for a document of semi-structured data with multiple hierarchically organized nodes comprising computer program instructions for execution in memory by at least one processor of a data processing system, wherein the computer program instructions when executed on the data processing system causes the data processing system to:
   load into the memory of the data processing system both a document of semi-structured data of irregularly structured data in textual form, and also a separate value index for the document,
   identify values present in said semi-structured document; index said values in said separate value index,
   compare values in the document to entries in the value index, and,
   respond to detecting non-presence in the document of at least one node in the value index,
   by indicating the non-presence of said node in said document by inserting in the value index a pseudo key,
   wherein the document is an XML document, and wherein the value index is an XML values index, the XML values index contains complete information of the multiple hierarchically organized nodes of the XML document.

6. A computer program product comprising a non-transitory computer useable storage medium including a computer readable program, wherein the computer readable program when executed on a computer causes the computer to:
   load into memory of the computer both a document of semi-structured data of irregularly structured data in textual form, and also a separate value index for the document,
   identify values present in said semi-structured document; index said values in said separate value index,
   compare values in the document to entries in the value index, and,
   respond to detecting non-presence in the document of at least one node in the value index,
   by indicating the non-presence of said node in said document by inserting in the value index a pseudo key,
   wherein the document is an XML document, and wherein the value index is an XML values index, the XML values index contains complete information of the multiple hierarchically organized nodes of the XML document.

7. A data processing system for creating a values index for a document of semi-structured data with multiple hierarchically organized nodes, comprising:

at least one computer with at least one processor and memory, the processor being configured to perform the operations of:

loading into the memory of the computer both a document of semi-structured data of irregularly structured data in textual form, and also a separate value index for the document, detecting values present in said semi-structured document, indexing said values in the separate value index, comparing by the processor of the computer values in the document to entries in the value index, and responsive to detecting non-presence in the document of at least one node in the value index, indicating by the processor the non-presence of said node in said document by inserting in the value index a pseudo key generated by a pseudo-key generating system executing in the memory of the computer, wherein the document is an XML document, and wherein the value index is an XML values index, the XML values index contains complete information of the multiple hierarchically organized nodes of the XML document.

* * * * *